United States Patent [19]

Shimidzu et al.

[11] Patent Number: 4,644,058

[45] Date of Patent: Feb. 17, 1987

[54] REACTIVE PYRIDONE AZO DYES HAVING BOTH MONOCHLOROTRIAZINYL AND VINYLSULFONE TYPE REACTIVE GROUPS

[75] Inventors: Yasutaka Shimidzu, Osaka; Naoki Harada, Ibaraki; Yasuo Tezuka, Nara, all of Japan

[73] Assignee: Sumitomo Chemical Company, Limited, Osaka, Japan

[21] Appl. No.: 442,590

[22] Filed: Nov. 18, 1982

[30] Foreign Application Priority Data

Nov. 25, 1981 [JP] Japan ............... 56-189755

[51] Int. Cl.[4] ................. C09B 62/028; C09B 62/45; C09B 62/51; C09B 1/382
[52] U.S. Cl. ................ 534/635; 534/617; 534/642; 534/582
[58] Field of Search ............ 534/632, 635, 638, 642, 534/617; 260/153

[56] References Cited

U.S. PATENT DOCUMENTS

| | | | |
|---|---|---|---|
| 3,223,470 | 12/1965 | Boedeker | 8/39 |
| 3,936,436 | 2/1976 | Berrie | 260/153 |
| 4,039,523 | 8/1977 | Hegar | 260/153 |
| 4,299,764 | 11/1981 | Jager | 534/635 |

FOREIGN PATENT DOCUMENTS

| | | | |
|---|---|---|---|
| 2430442 | 2/1980 | France . | |
| 55-13790 | 4/1980 | Japan . | |
| 56-159373 | 2/1981 | Japan | 534/638 |
| 56-37379 | 4/1981 | Japan | 534/635 |
| 56-92961 | 7/1981 | Japan | 534/635 |

OTHER PUBLICATIONS

Chemical Abstracts, vol. 95, No. 8, Aug. 1981, p. 73, No. 63672 C, Columbus, Ohio, USA and JP-A-81 37379 (Sumitomo Chemical Co., Ltd.), 11-04-1981 Abstract.
Chemical Abstracts, vol. 95, No. 8, Dec. 1981, p. 75, No. 205410 S, Columbus, Ohio, USA and JP-A-81 92961 (Sumitomo Chemical Co., Ltd.), 28-07-1981 Abstract.

*Primary Examiner*—Floyd D. Higel
*Attorney, Agent, or Firm*—Stevens, Davis, Miller & Mosher

[57] ABSTRACT

A monoazo compound represented by a free acid of the formula:

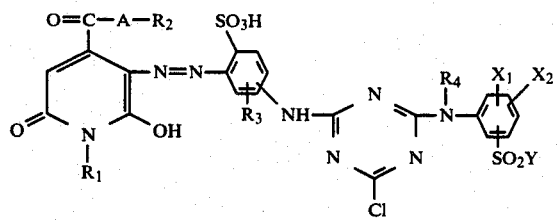

wherein $R_1$ and $R_2$ independently represent a hydrogen atom, or an alkyl, aralkyl or cyclohexyl group; $R_3$ represents a hydrogen atom or a methyl or sulfonic acid group; $R_4$ represents a hydrogen atom or an alkyl group; A represents an oxygen atom or —NH—; $X_1$ and $X_2$ independently represent a hydrogen or chlorine atom, or a methyl, methoxy, carboxyl or sulfonic acid group; and Y represents —CH=CH$_2$ or —CH$_2$CH$_2$Z in which Z represents a halogen atom, —OSO$_3$H or —OPO$_3$H$_2$. This compound is used for dyeing cellulose fibers to give dyed products of yellow to reddish yellow having excellent fastnesses, particularly chlorine fastness.

6 Claims, No Drawings

REACTIVE PYRIDONE AZO DYES HAVING BOTH MONOCHLOROTRIAZINYL AND VINYLSULFONE TYPE REACTIVE GROUPS

This invention relates to novel monoazo compounds, a process for producing them and a process for dyeing cellulose fiber by using them.

Dyes having a β-sulfatoethylsulfonyl group are known as the so-called vinylsulfone type reactive dyes for dyeing fiber materials. However, products dyed with yellow azo reactive dyes of this kind are generally low in chlorine fastness, so that they often discolor due to chlorine present in city water.

Yellow dyes having a monochlorotriazinyl group as a reactive group are also known. For example, the following dyes are disclosed in Published Unexamined Japanese Patent Application No. 13,790/80:

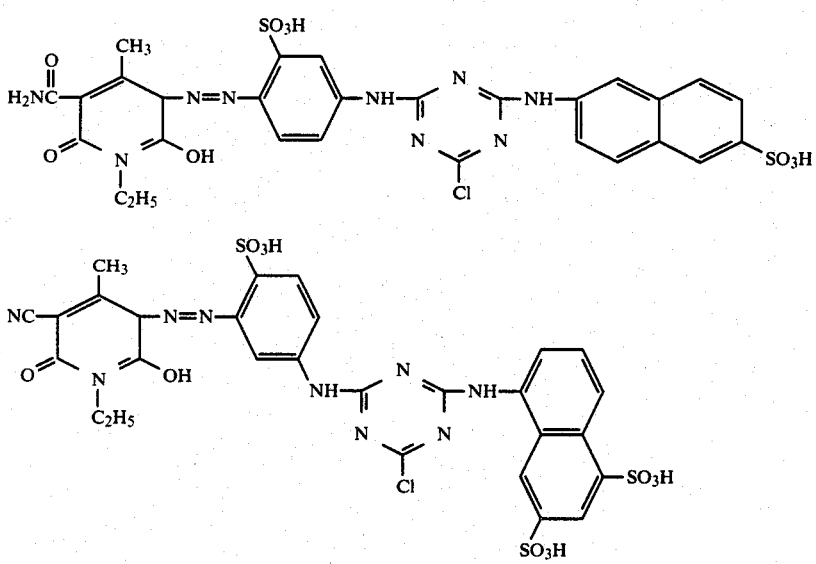

However, these reactive dyes generally require a high dyeing temperature and lack exhaustion dyeing ability, and thus they are used only for printing. In addition, products dyed with these dyes have a fault of low acid stability.

The present inventors earnestly studied to find a yellow vinylsulfone type reactive dye particularly excellent in chlorine fastness and acid stability and superior suitability for exhaustion dyeing, and as a result, it was found that particular monoazo compounds having both the so-called vinylsulfone type reactive group and a monochlorotriazinyl group can give a yellow to reddish-yellow dyed product meeting the above requirements.

Thus, the present invention provides a monoazo compound represented by a free acid of the formula (I):

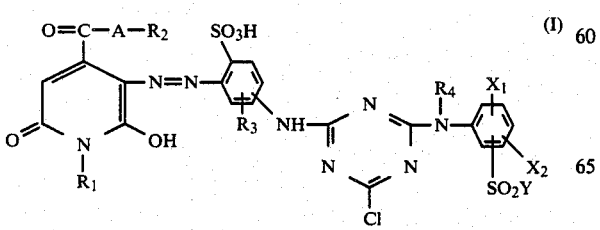

wherein $R_1$ and $R_2$ independently represent a hydrogen atom, or an alkyl, aralkyl or cyclohexyl group; $R_3$ represents a hydrogen atom, or a methyl or sulfonic acid group; $R_4$ represents a hydrogen atom or an alkyl group; A represents an oxygen atom or —NH— group; $X_1$ and $X_2$ independently represent a hydrogen or chlorine atom, or a methyl, methoxy, carboxyl or sulfonic acid group; and Y represents —CH=CH$_2$ or —CH$_2$CH$_2$Z in which Z represents a halogen atom, —OSO$_3$H or —OPO$_3$H$_2$; and a process for producing the monoazo compound represented by the above formula (I), which comprises (1) condensing an aromatic diamine represented by the formula (II):

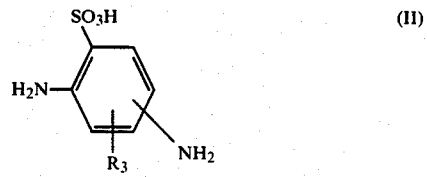

wherein $R_3$ is as defined above, and an aromatic amine represented by the formula (III):

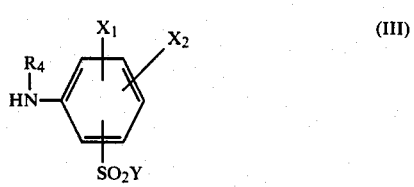

wherein $R_4$, $X_1$, $X_2$ and Y are as defined above, with cyanuric chloride to obtain an amine compound represented by the formula (IV):

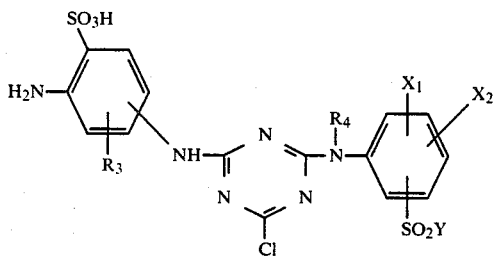

(IV)

wherein R₃, R₄, X₁, X₂ and Y are as defined above, diazotizing the amine compound (IV) and then coupling the diazotized product with a pyridone compound represented by the formula (V):

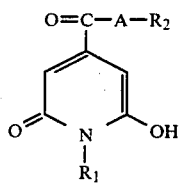

(V)

wherein $R_1$, $R_2$ and A are as defined above, or (2) condensing the aromatic diamine of the formula (II) with cyanuric chloride, diazotizing the resulting condensate, coupling the diazotized product with the pyridone compound of the formula (V) to obtain a monoazo pyridone compound represented by the formula (VI):

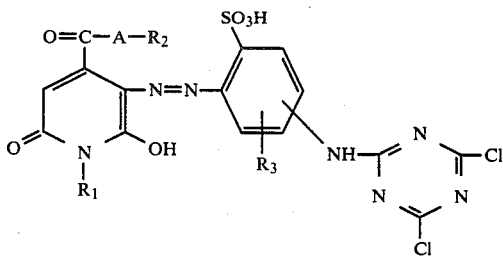

(VI)

wherein $R_1$, $R_2$, $R_3$ and A are as defined above, and then condensing the monoazo compound of the formula (VI) with the aromatic amine of the formula (III).

This invention also provides a process for dyeing cellulose fibers, which comprises using the monoazo compound represented by formula (I).

The monoazo compounds of the present invention represented by the formula (I) are excellent in various dye characteristics (high exhustion yield and fixation yield, excellent build-up property, etc.) and are useful as a reactive dye giving yellow to reddish yellow dyed products excellent in various fastness properties (fastnesses to chlorine, light, perspiration-sunlight, etc.) and excellent in wash-off property.

The present invention is illustrated below in greater detail.

The aromatic diamine of the formula (II) usable for the present invention includes;
2,4-diaminobenzenesulfonic acid,
4,6-diaminobenzene-1,3-disulfonic acid,
2,5-diaminobenzenesulfonic acid,
2,4-diamino-5-methylbenzenesulfonic acid and the like.

Regarding the aromatic amine of the formula (III), the alkyl group represented by R₄ may be unsubstituted or substituted, and includes, for example, methyl, ethyl, propyl, butyl, hydroxymethyl, 2-hydroxyethyl, 2-hydroxypropyl, 3-hydroxypropyl, 2-hydroxybutyl, 4-hydroxybutyl, 1-methyl-2-hydroxypropyl, cyanomethyl, cyanoethyl, methoxymethyl, 2-methoxyethyl, 3-methoxypropyl, ethoxymethyl, 2-ethoxyethyl, chloromethyl, 2-chloroethyl, 3-chloropropyl, 4-chlorobutyl, carboxymethyl, 2-carbamoylethyl, 2-methoxycarbonylethyl, 2-ethoxycarbonylmethyl, sulfomethyl and 2-sulfoethyl groups and the like. Examples of the

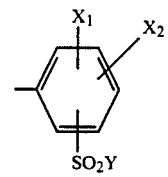

group include:
o-, m- or p-(β-sulfoxyethylsulfonyl)-phenyl,
o-, m- or p-(vinylsulfonyl)-phenyl,
o-, m- or p-(β-chloroethylsulfonyl)-phenyl,
o-, m- or p-(phosphoxyethylsulfonyl)-phenyl,
4-methoxy-3-(β-sulfoxyethylvinyl, β-chloroethyl or β-phosphoxyethylsulfonyl)-phenyl,
2-methoxy-5-(β-sulfoxyethyl, vinyl, β-chloroethyl or β-phosphoxyethylsulfonyl)-phenyl,
2-methoxy-5-methyl-4-(β-sulfoxyethyl, vinyl, β-chlorethyl or β-phosphoxyethylsulfonyl)-phenyl,
2,5-dimethoxy-4-(β-sulfoxyethyl, vinyl, β-chlorethyl or β-phosphoxyethylsulfonyl)-phenyl,
2-carboxy-5-(β-sulfoxyethyl, vinyl, β-chlorethyl or β-phosphoxyethylsulfonyl)-phenyl,
2-chloro-4-(β-sulfoxyethyl, vinyl, β-chlorethyl or β-phosphoxyethylsulfonyl)-phenyl, and the like.

Regarding the pyridone compound of the formula (V), the alkyl and aralkyl group represented by $R_1$ and $R_2$ may be unsubstituted or substituted. Examples of said alkyl group include straight or branched chain unsubstituted alkyl groups such as methyl, ethyl, propyl, butyl, amyl, hexyl, octyl, nonyl, dodecyl and the like; hydroxyalkyl groups such as hydroxyethyl, hydroxypropyl and the like; and alkoxyalkyl groups such as alkoxyethyl groups (for example, methoxyethyl, ethoxyethyl, butoxyethyl, etc.), and the like. Examples of said aralkyl group include benzyl, p-methyl- or p-ethyl-benzyl, m-methyl- or m-ethyl-benzyl, p-methoxy- or p-ethoxy-benzyl, m-methoxy- or m-ethoxy-benzyl, p-dimethylamino- or p-diethylamino-benzyl, phenethyl, and p-methyl-, p-ethyl-, p-methoxy- or p-ethoxy-phenethyl.

The pyridone compound of the formula (V) can be produced either by alkylating citrazinic acid with an alkylating agent, if necessary followed by esterification or amidation, or by subjecting a citric triester or an aconitic triester and an amine derivative to cyclizing condensation reaction.

The monoazo compound represented by the formula (I) may be produced in the following manner.

The aromatic diamine of the formula (II) is condensed with cyanuric chloride in an aqueous medium, in the presence of a nonionic surfactant and at a temperature of −10° C. to +20° C. (preferably 0° C. to +10° C.) while adjusting pH to 1-5 (preferably 2-4). Then, the condensation product is condensed with the aromatic amine of the formula (III) at a temperature of 10° C. to 60° C. (preferably 30° C. to 50° C.) at a pH of 4-7

(preferably 5-6). Thus, the amine compound of the formula (IV) is obtained.

The amine compound of the formula (IV) can be also obtained by condensing the aromatic amine of the formula (III) with cyanuric chloride in the same manner as above and then condensing the condensation product with the aromatic diamine of the formula (II) in the same manner as above.

The amine compound (IV) thus obtained is then diazotized in a usual manner, for example, by using a small excessive amount of sodium nitrite at a temperature of $-10°$ C. to $+30°$ C. (preferably $-5°$ C. to $+10°$ C.). Then, the diazotized product is coupled with the pyridone compound of the formula (V) at a temperature of $-10°$ C. to $+50°$ C. (preferably 0° C. to $+20°$ C.) while adjusting the pH to 4-7 (preferably 5-6), whereby the monoazo compound of the formula (I) is obtained.

Alternatively, it is also possible to obtain the monoazo compound of the formula (I) in the following manner. The condensation product of the aromatic diamine of the formula (II) and cyanuric chloride obtained in the same manner as above is diazotized in a usual manner, for example, by using a small excessive amount of sodium nitrite at a temperature of $-10°$ C. to $+20°$ C.

(preferably $-5°$ C. to $+10°$ C.). Then, the diazotized product is coupled with the pyridone compound of the formula (V) at a temperature of $-10°$ C. to $+40°$ C. (preferably $-5°$ C. to $+20°$ C.) while adjusting the pH to 4-9 (preferably 5-7) to obtain the monoazo pyridone compound of the formula (VI). The monoazo pyridone compound is then condensed with the aromatic amine of the formula (III) at a temperature of 10° C. to 70° C. (preferably 30° C. to 50° C.) at pH 4-7 (preferably at pH 5-6) to obtain the monoazo compound of the formula (I).

As the monoazo compound obtainable in the above-mentioned manner, the compounds represented by the following structural formulas, in which

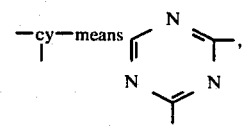

can be exemplified.

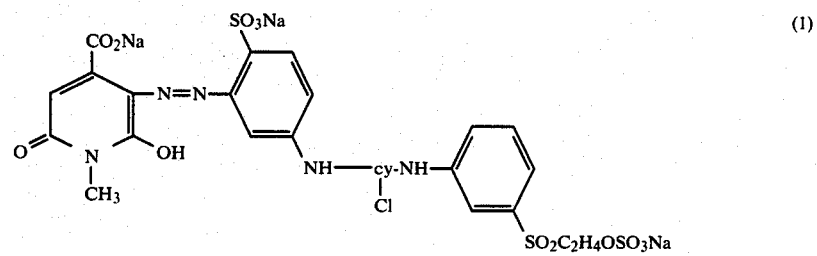

(1)

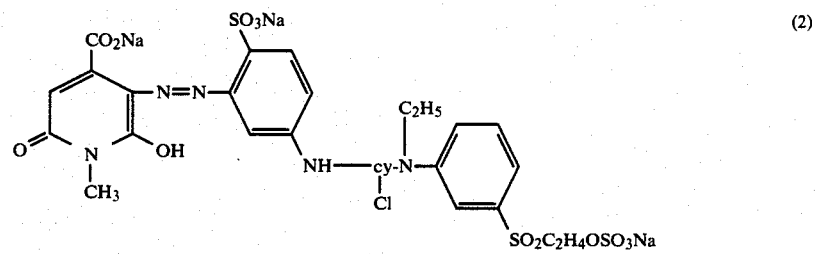

(2)

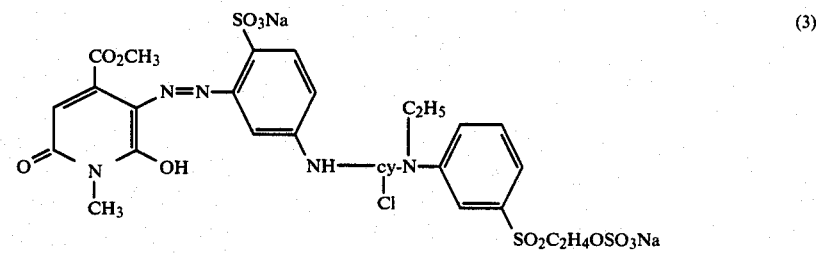

(3)

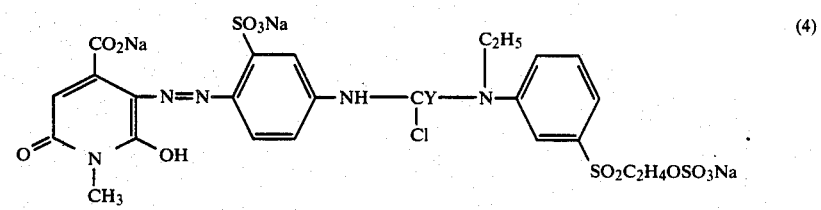

(4)

-continued
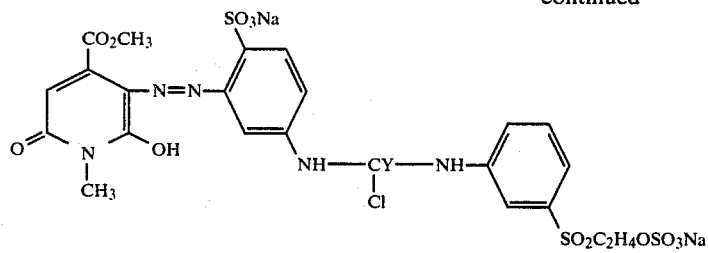
(5)
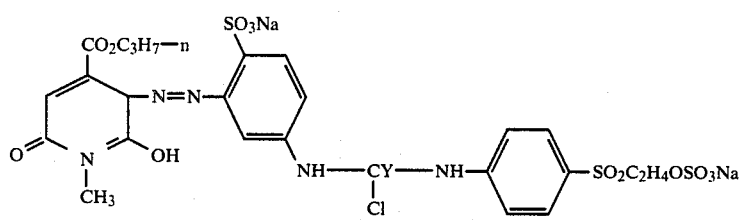
(6)
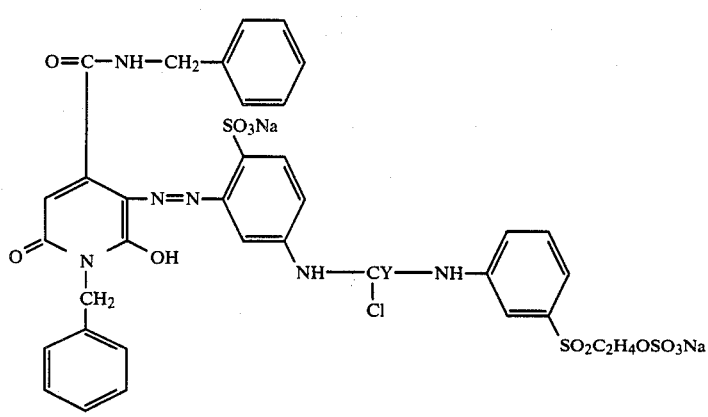
(7)
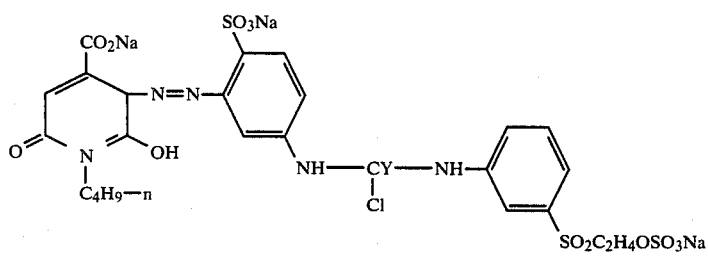
(8)
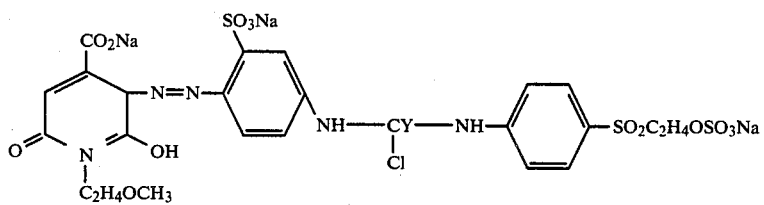
(9)
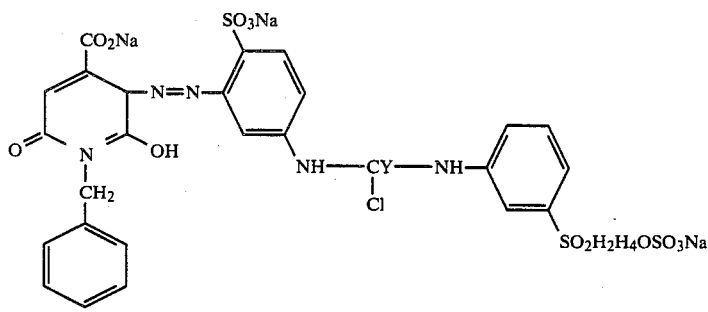
(10)

-continued
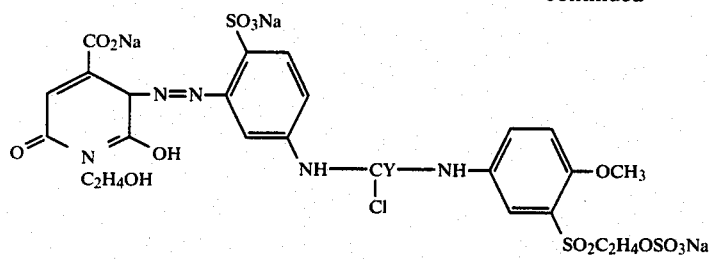
(11)
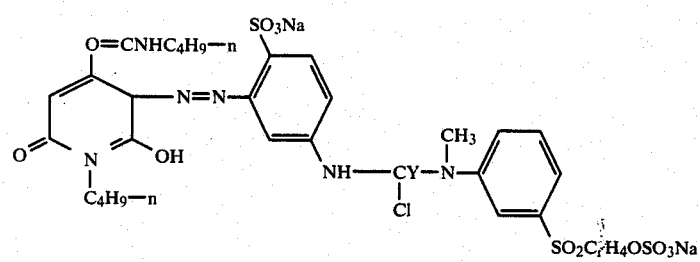
(12)
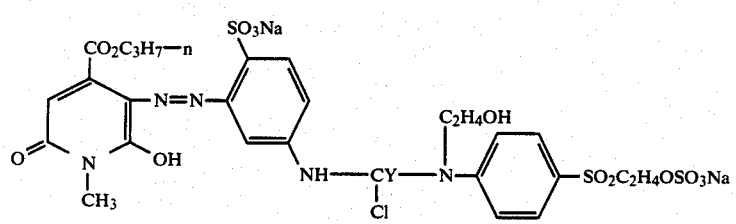
(13)
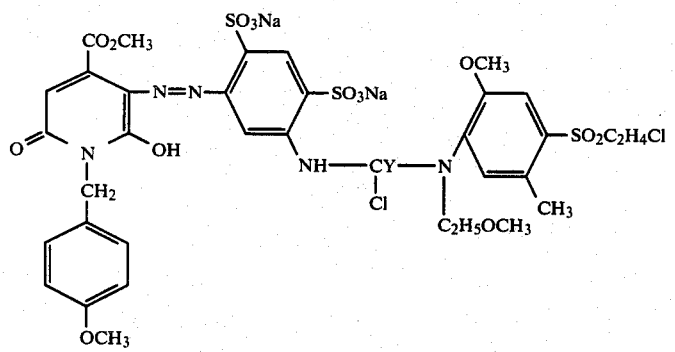
(14)
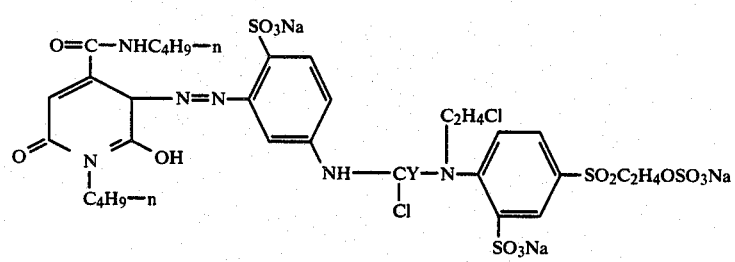
(15)
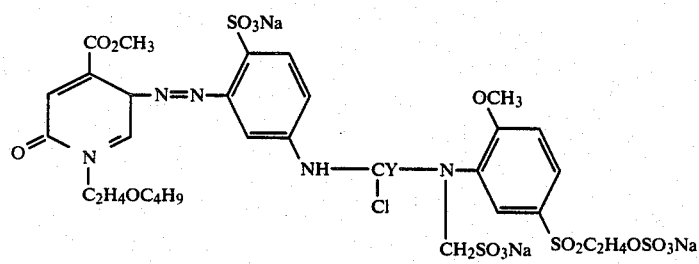
(16)

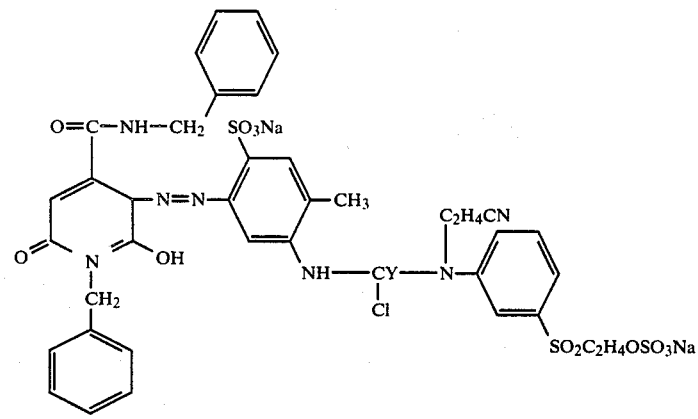

(17)

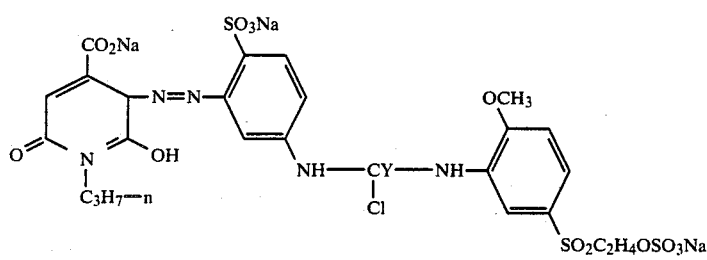

(18)

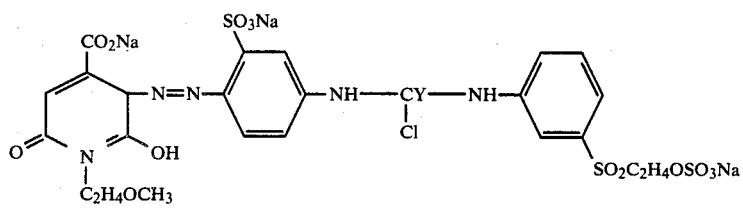

(19)

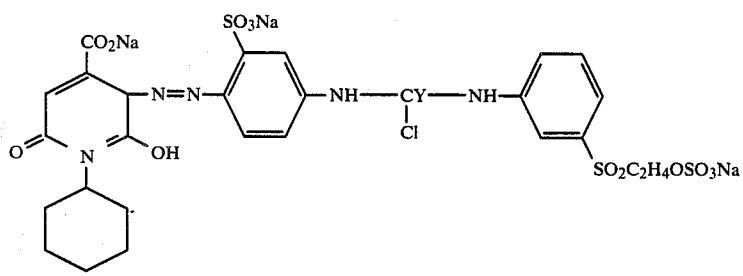

(20)

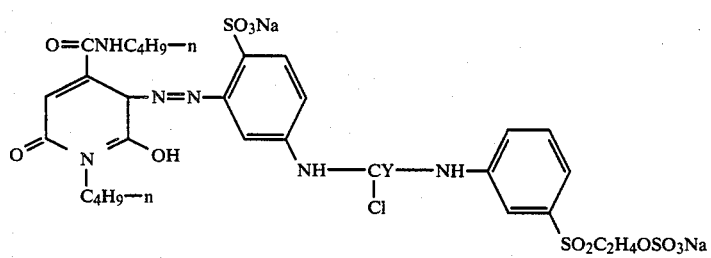

(21)

The monoazo compounds of this invention represented by the above formula (I) can be used for dyeing cellulose fibers yellow to reddish yellow in conventional dyeing processes, such as exhaustion dyeing, printing, continuous dyeing including cold pad batch up processes, and the like.

Cellulose fibers to be dyed include natural and regenerated cellulose fibers such as cotton, flax, viscose rayon, viscose staple fiber and the like.

In the case of exhaustion dyeing, it can be carried out in a dyeing bath containing sodium sulfate or sodium chloride and an acid-bonding agent such as sodium carbonate, trisodium phosphate, sodium hydroxide or the like at a relatively low temperature. In the case of printing, it can be carried out by, for example, printing a color paste comprising urea, an acid-bonding agent such as sodium bicarbonate, sodium carbonate, trisodium phosphate, sodium hydroxide or the like, and a paste (preferably, sodium alginate), to the fiber, predrying and then heating or steaming at a temperature of 100°–200° C.

The monoazo compound of this the present invention can give dyed products excellent particularly in chlorine fastness (3–4th to 4th grade). Since the use of chlorine bleaching agents has become popular in washing at home, the monoazo compound of this invention excellent in chlorine fastness is of high value. Further, the monoazo compound of this invention is excellent in fastnesses to light and to perspiration-sunlight, and is therefore suitable for dyeing outdoor wears such as sports wear.

Further, the monoazo compounds of the present invention show a high exhaustion yield and a high fixation yield in exhaustion dyeing, and therefore can give a dyed product having a color of deep hue. In addition, these compounds are excellent in wash-off property, so that the unfixed dye can readily be removed.

The monoazo compounds of the present invention have a unique property such that in exhaustion dyeing they are unsusceptible to changes in dyeing temperature, alkaline agent, the amount of inorganic salt and bath ratio, so that they can dye the fiber with a very high reproducibility.

This invention will be illustrated with reference to the following examples, wherein parts are by weight.

EXAMPLE 1 (COMPOUND NO. 1)

9.2 parts of cyanuric chloride was dispersed in a solution of 0.1 part of nonionic surfactant in 100 parts of water at 0°–10° C. To the dispersion, a solution of 10.5 parts of sodium 2,4-diaminobenzenesulfonate in 100 parts of water was added dropwise over a time period of 1 hour at 0°–5° C. while maintaining pH at 2–3, and then the resulting mixture was stirred for about 2 hours.

Subsequently, 16.9 parts of 1-aminobenzene-3-$\beta$-sulfatoethylsulfone was added. The resulting mixture was heated to 30°–40° C. while adjusting its pH to 5–6 with aqueous solution of sodium carbonate, and then it was stirred at that temperature for 5 hours.

In the resulting reaction mixture was dissolved 3.5 parts of sodium nitrite, and 13 parts of concentrated hydrochloric acid was added thereto at 0°–5° C. to perform diazotization. Subsequently, the diazonium liquor was added to a solution prepared by dissolving 8.5 parts of 1-methyl-6-hydroxy-4-hydroxycarbonyl-2-pyridone in 100 parts of water, and adjusting the pH of the resulting solution to 5–6 with an aqueous solution of sodium hydroxide, while maintaining the pH at 5–6.

Then, 100 parts of sodium chloride was added to the reaction mixture to precipitate a crystalline product. It was filtered with suction, washed and dried at 60° C. to obtain 51.3 parts of a dye having the following formula:

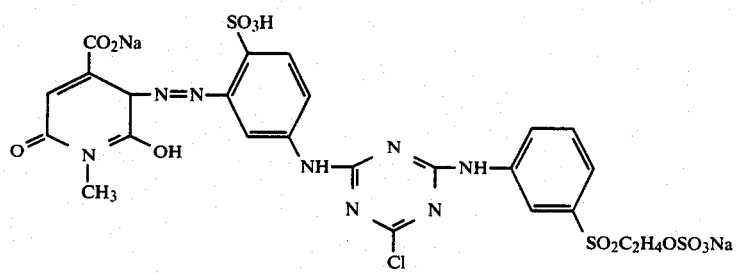

($\lambda$max 420 nm)

EXAMPLE 2 (COMPOUND NO. 3)

9.2 parts of cyanuric chloride was dispersed in a solution of 0.1 part of nonionic surfactant in 100 parts of water at 0° to 10° C. To the dispersion, a solution of 10.5 parts of sodium 2,4-diaminobenzenesulfonate in 100 parts of water was added dropwise at 0°–5° C. over a time period of 1 hour while maintaining the pH at 2–3, and then the resulting mixture was stirred for about 2 hours. The mixture was adjusted to a pH of 7–8 by adding a 20% aqueous solution of sodium carbonate, and then 3.5 parts of sodium nitrite was added and dissolved therein. Thereafter 12.7 parts of concentrated hydrochloric acid was added thereinto to carry out diazotization. The resulting diazonium liquor was added to a suspension prepared by suspending 9.3 parts of 1-methyl-6-hydroxy-4-methoxycarbonyl-2-pyridone into 100 parts of water and adjusting the pH to 5–6 with an aqueous solution of sodium hydroxide, and then 5 parts of sodium bicarbonate was added thereto.

To this reaction mixture was added 18.4 parts of 1-N-ethylaminobenzene-3-$\beta$-sulfatoethylsulfone. The resulting mixture was heated to 30°–40° C. while adjusting its pH to 5–6, and stirred at that temperature for 5 hours. Then, 100 parts of sodium chloride was added to precipitate a crystalline product, and it was filtered with suction, washed and dried at 60° C. to obtain 51.7 parts of a dye having the following formula:

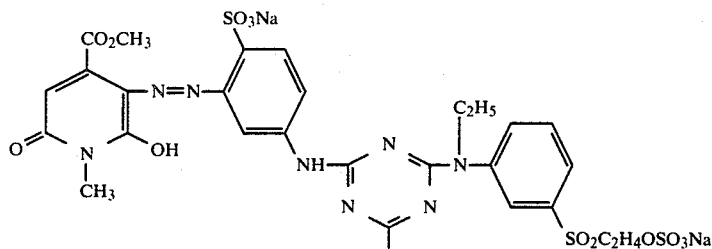

(λmax 420 nm)

EXAMPLE 3 (COMPOUND NO. 5)

9.2 parts of cyanuric chloride was dispersed in a solution of 0.1 part of nonionic surfactant in 100 parts of water at 0° to 10° C. Into the resulting dispersion, a solution of 10.5 parts of sodium 2,4-diaminobenzenesulfonate in 100 parts of water was added dropwise at 0°–5° C. over a time period of 1 hour while maintaining the pH at 2–3, and then the mixture was stirred for about 2 hours. The mixture was adjusted to a pH of 7–8 by adding a 20% aqueous solution of sodium carbonate and then 3.5 parts of sodium nitrite was added and dissolved therein. Thereafter 12.7 parts of concentrated hydrochloric acid was added thereinto at 0°–5° C. to carry out diazotization. The resulting diazonium liquor was added to a suspension prepared by suspending 9.3 parts of 1-methyl-6-hydroxy-4-methoxycarbonyl-2-pyridone into 100 parts of water and adjusting the pH value to 5–6 with an aqueous solution of sodium hydroxide, and then 5 parts of sodium bicarbonate was added thereto.

To this reaction mixture was added 16.9 parts of 1-aminobenzene-3-β-sulfatoethylsulfone, and the resulting mixture was heated to 30°–40° C. while adjusting its pH to 5–6, and stirred at that temperature for 5 hours. Then, 100 parts of sodium chloride was added to precipitate a crystalline product, and it was filtered with suction, washed and dried at 60° C. to obtain 50.2 parts of a dye having the following formula:

EXAMPLE 4 (COMPOUND NO. 20)

9.2 parts of cyanuric chloride was dispersed in a solution of 0.1 part of nonionic surfactant in 100 parts of water at 0° to 10° C. Into the dispersion, a solution of 10.5 parts of sodium 2,5-diaminobenzenesulfonate in 100 parts of water was added dropwise at 0°–5° C. over a time period of 1 hour while maintaining the pH at 2–3, and then the resulting mixture was stirred for about 2 hours. The mixture was adjusted to a pH of 7–8 by adding a 20% aqueous solution of sodium carbonate and then 3.5 parts of sodium nitrite was added and dissolved therein. Thereafter 12.7 parts of concentrated hydrochloric acid was added thereinto at 0°–5° C. to carry out diazotization. The resulting diazonium liquor was added to a suspension prepared by suspending 11.9 parts of 1-cyclohexyl-6-hydroxy-4-hydroxycarbonyl-2-pyridone into 100 parts of water and adjusting its pH to 5–6 with an aqueous solution of sodium hydroxide, and 5 parts of sodium bicarbonate was added thereto.

To this reaction mixture was added 16.9 parts of 1-aminobenzene-3-β-sulfatoethylsulfone sulfate, and the resulting mixture was heated to 30°–40° C. while adjusting the pH to 5–6 and was stirred at that temperature for 5 hours. Then, 75 parts of sodium chloride was added to precipitate a crystalline product, and it was filtered with suction, washed and dried at 60° C. to obtain 49.7 parts of a dye having the following formula:

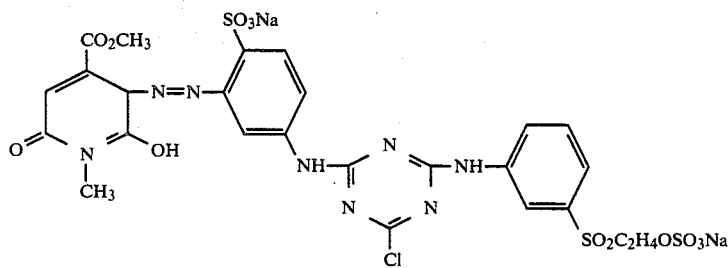

(λmax 420 nm)

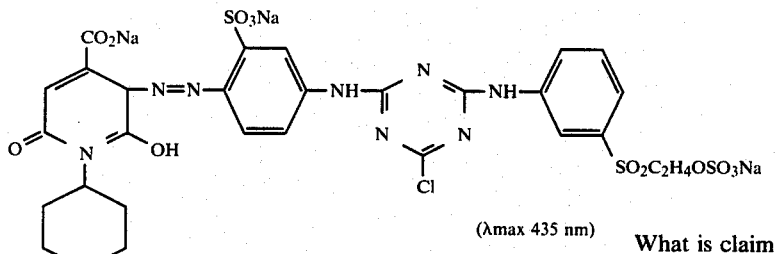

(λmax 435 nm)

EXAMPLE 5

0.3 parts of the dye of Compound No. 1 was dissolved in 200 parts of water, and 20 parts of sodium sulfate and 10 parts of cotton were added in this order, and the bath was heated to 50° C. 30 minutes thereafter, 4 parts of sodium carbonate was added, and dyeing was continued at that temperature for 1 hour. After completion of the dyeing, the cotton was washed with water and soaped to obtain a yellow dyed product excellent in fastnesses, particularly in chlorine fastness.

EXAMPLE 6

0.3 parts of the dye of Compound No. 3 was dissolved in 200 parts of water, and 20 parts of sodium sulfate and 10 parts of cotton were added in that order, and the bath was heated to 40° C. 20 minutes thereafter, 3 parts of trisodium phosphate was added, and dyeing was continued at that temperature for 1 hour. After completion of dyeing, the cotton was washed with water and soaped to obtain a yellow colored dyed product excellent in fastnesses, particularly in chlorine fastness.

EXAMPLE 7

| Color paste composition: | |
|---|---|
| Dye of Compound No. 1 | 5 parts |
| Urea | 5 parts |
| Raw paste containing 5% of sodium alginate | 50 parts |
| Hot water | 25 parts |
| Sodium bicarbonate | 2 parts |
| Balance | 13 parts |

The color paste having the above composition was printed on a mercerized cotton broad cloth. After pre-drying, the cloth was steamed at 100° C. for 5 minutes, and thereafter washed with hot water, soaped, washed with hot water and then dried.

Thus, a yellow printed product excellent in chlorine fastness was obtained.

EXAMPLE 8

Thirty parts of the dye of Compound No. 3 was dissolved in 925 parts of hot water and then the solution was cooled to room temperature (about 20° C.). To this solution were added 15 parts of 32.5% aqueous solution of sodium hydroxide and 30 parts of sodium sulfate to prepare a dye liquor. A cellulose fabric was dipped in this liquor, squeezed up to a pick-up of 65% by a known method to carry out a padding. After winding up, the padded cellulose fabric was tightly wrapped with polyethylene film and allowed to stand for 20 hours at room temperature (about 20° C.). Subsequently, the cellulose fabric was washed with cold water and then with hot water, soaped in a boiling detergent solution, again washed with cold water and then dried. Thus, a dyed product having a very deep yellow color and free from unevenness in color was obtained.

What is claimed is:

1. A monoazo compound represented by a free acid of the formula,

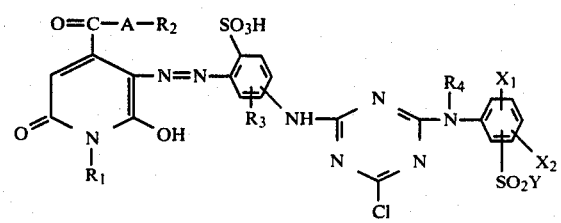

wherein $R_1$ and $R_2$ independently represent hydrogen, alkyl unsubstituted or substituted with hydroxy or alkoxy, aralkyl unsubstituted or substituted with alkyl, alkoxy or alkylamine, or cyclohexyl; $R_3$ represents hydrogen, methyl or sulfonic acid; $R_4$ represents hydrogen or alkyl unsubstituted or substituted with hydroxy, alkoxy, chloro, carboxy, alkoxy carbonyl or sulfo; A represents oxygen; $X_1$ and $X_2$ independently represent hydrogen, chlorine, methyl, methoxy, carboxyl or sulfonic acid; and Y represents $-CH=CH_2$ or $-CH_2CH_2Z$ in which Z represents halogen, $-OSO_3H$ or $-OPO_3H_2$.

2. The compound according to claim 1, wherein $R_3$ is hydrogen.

3. The compound according to claim 1, wherein $R_4$ is selected from hydrogen, $C_1$-$C_3$ alkyl, 2-carboxyethyl, 2-carbamoylethyl and 2-hydroxyethyl.

4. A monoazo compound represented by a free acid of the formula,

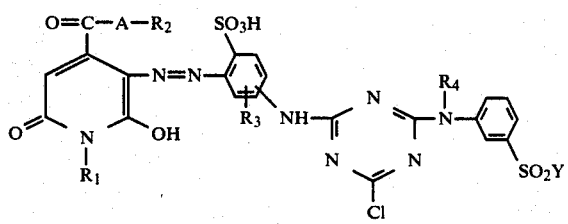

wherein $R_1$ and $R_2$ independently represent hydrogen, alkyl unsubstituted or substituted with hydroxy or alkoxy, aralkyl unsubstituted or substituted with alkyl, alkoxy or alkylamino, or cyclohexyl; $R_3$ represents hydrogen, methyl or sulfonic acid; $R_4$ represents hydrogen or alkyl unsubstituted or substituted with hydroxy, alkoxy, chloro, carboxy, alkoxy, carbonyl or sulfo; A represents oxygen; and Y represents $-CH=CH_2$ or $-CH_2CH_2Z$ in which Z represents halogen, $-OSO_3H$ or $-OPO_3H_2$.

5. The compound according to claim 4, wherein $R_3$ is hydrogen.

6. The compound according to claim 5, wherein $R_4$ is selected from hydrogen, $C_1$-$C_3$ alkyl, 2-carboxyethyl, 2-carbamoylethyl and 2-hydroxyethyl group.

* * * * *